US005906648A

United States Patent [19]

Zoratti et al.

[11] Patent Number: 5,906,648

[45] Date of Patent: May 25, 1999

[54] COLLISION AVOIDANCE SYSTEM FOR VEHICLES HAVING ELEVATED APPARATUS

[75] Inventors: Paul K. Zoratti; Thomas J. Blessing, both of Canton, Mich.

[73] Assignee: ERIM International, Inc., Ann Arbor, Mich.

[21] Appl. No.: 08/902,423

[22] Filed: Jul. 29, 1997

Related U.S. Application Data

[60] Provisional application No. 60/022,751, Jul. 29, 1996.

[51] Int. Cl.[6] .................... G06F 7/70

[52] U.S. Cl. .................... 701/50; 701/301; 340/436

[58] Field of Search .................... 701/50, 300, 301; 340/436, 435, 903, 943, 689; 180/275, 279; 293/2, 3, 4; 37/348; 172/2

[56] References Cited

U.S. PATENT DOCUMENTS

| | | | |
|---|---|---|---|
| 4,511,974 | 4/1985 | Nakane et al. | 701/124 |
| 4,635,982 | 1/1987 | Feldmann et al. | 293/2 |
| 4,942,529 | 7/1990 | Avitan et al. | 701/50 |
| 4,949,263 | 8/1990 | Jurca | 701/50 |
| 4,957,408 | 9/1990 | Ohkura | 701/50 |
| 4,994,973 | 2/1991 | Makino et al. | 701/50 |
| 5,389,912 | 2/1995 | Arvin | 340/435 |

*Primary Examiner*—Jacques H. Louis-Jacques
*Attorney, Agent, or Firm*—Gifford, Krass, Groh, Sprinkle, Anderson & Citkowski, PC

[57] ABSTRACT

A collision avoidance system for a vehicle of the type having a powered lift mechanism with a lift control used to move the mechanism between a predetermined safe position and an elevated position includes a first sensor to determine whether the mechanism is in the safe or the elevated position, and a second sensor used to determine whether an operator is using the lift control to power the mechanism beyond the safe position. If the mechanism is in the elevated position and the operator is not using the lift control to power the mechanism beyond the safe position, control electronics are operative to automatically transfer the mechanism from the elevated position back to the safe position without operator intervention. Means may be provided for alerting an operator of the vehicle when the mechanism is in the elevated position, for example, in the form of an intermittent, periodic audible and/or visual indicator which continues until the mechanism is brought back to the safe position. A vehicle speed sensor coupled to the control electronics may also be provided to cause the automatic transfer of the mechanism to occur move rapidly as a function of increasing vehicle speed.

12 Claims, 1 Drawing Sheet

COLLISION AVOIDANCE SYSTEM FOR VEHICLES HAVING ELEVATED APPARATUS

REFERENCE TO RELATED APPLICATION

This application claims priority of U.S. provisional application Ser. No. 60/022,751, filed Jul. 29, 1996, the entire contents of which are incorporated herein by reference.

FIELD OF THE INVENTION

The present invention relates generally to collision avoidance and, in particular, to a collision avoidance system for use with vehicles having lifting mechanisms such as overhead buckets, forklifts, and the like.

BACKGROUND OF THE INVENTION

Problems associated with vehicles having lift mechanisms which collide with overhead obstructions have become increasingly prevalent in recent years. There are many reasons for this, including increased truck traffic, drivers who are unfamiliar with the operating environment of their vehicles, and the deterioration of highway infrastructures due to reduced budgetary allocations.

U.S. Pat. No. 5,389,912, entitled TRUCK CLEARANCE ANTI-COLLISION DEVICE, provides a useful background associated with the problem of tractor-trailer type semi-trucks coming in contact with overhead obstructions such as bridges, and so forth. As a solution to this problem, this patent proposes a vehicle clearance anti-collision device which includes an ultrasonic transmitter and receiver for receiving signals reflected off of an object disposed vertically above the cab portion of the vehicle. An on-board computer operatively associated with the transmitter and receiver automatically calculates the vertical distance between the height of the truck and the object being approached, and provides to an operator information as to the available clearance.

There are many potential problems associated with systems of the kind just described. Firstly, in the event that the vehicle is traveling at high speed, despite the warning provided by the transmitter/receiver, notification to an operator may come too late. Secondly, by virtue of the ultrasonic transducers involved, in conjunction with the computer automation and operator indicators, such a system may be too expensive for all but the most precious vehicles or cargo. In addition, this patent, and others like it, do not address the particular needs of vehicles having vertical extensible but retractable apparatus in the form of dump boxes, booms, lift buckets and fork lifts, which may only present a hazard with respect to overhead objects when the apparatus is in its extended position. That is, with the apparatus retracted, collision may inherently be avoided. Accordingly, there remains a need for a simple solution to collision avoidance in the case of vehicles having such vertically extensible/retractable apparatus.

SUMMARY OF THE INVENTION

This invention resides in a collision avoidance system for a vehicle of the type having a powered lift mechanism with a lift control used to move the mechanism between a predetermined safe position and an elevated position. Broadly, the system includes a first sensor used to determine whether the mechanism is in the safe or the elevated position, and a second sensor used to determine whether an operator is using the lift control to power the mechanism beyond the safe position. If the mechanism is in the elevated position and the operator is not using the lift control to power the mechanism beyond the safe position, control electronics are operative to automatically transfer the mechanism from the elevated position back to the safe position without operator intervention. Means may be provided for alerting an operator of the vehicle when the mechanism is in the elevated position, for example, in the form of an intermittent, periodic audible and/or visual indicator which continues until the mechanism is brought back to the safe position. A vehicle speed sensor coupled to the control electronics may also be provided to cause the automatic transfer of the mechanism to occur only when the vehicle is in motion, or to occur move rapidly as a function of increasing vehicle speed.

Thus, in a vehicle of the type having a powered lift mechanism with a lift control used to move the mechanism between a predetermined safe position and an elevated position, a collision avoidance method according to the invention includes the steps of sensing whether the mechanism is in the safe or the elevated position; sensing whether an operator is using the lift control to power the mechanism beyond the safe position; and, if the mechanism is in the elevated position and operator is not using the lift control to power the mechanism beyond the safe position, automatically moving the mechanism back to the safe position from the elevated position.

The invention may take the form of a module adapted for inclusion in an existing vehicle, or may be factory supplied along with the vehicle.

DETAILED DESCRIPTION OF THE INVENTION

Figure 1:
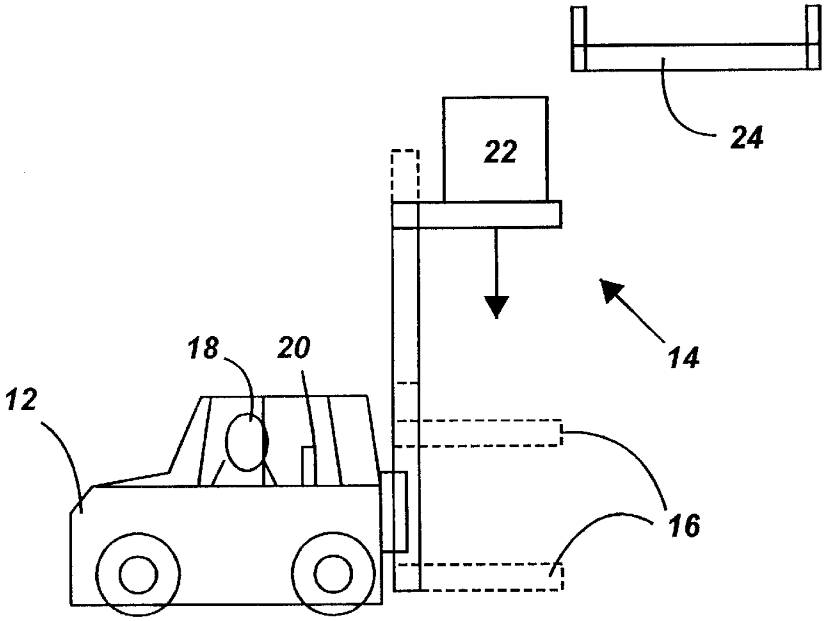
FIG. 1 is a simplified drawing of a vehicle incorporating the invention.

The present invention resides in a method and apparatus to mitigate collisions between vehicle-hosted elevated apparatus and infrastructure-based overhead objects. Such vehicle-hosted elevated apparatus may be in any form, but is commonly manifested as dump boxes, booms, lift buckets, fork lifts, and the like. In terms of infrastructure-based objects, again, the invention addresses bridge overpasses, traffic signal, power lines, trees, garage doors, or any other overhead object or obstruction which may temporarily present a collision hazard with such a vehicle-hosted elevated apparatus.

Broadly, and in general terms, one objective of the invention is to permit normal operation of the elevated apparatus, but, upon deactivation, to automatically lower the apparatus to a predetermined safe elevation. The operator may raise the apparatus past the safe height, that is, the operator may "power beyond" the safe height by activating the normal apparatus elevation mechanism, be it through hydraulic lever, electronic switch, or so forth, and the system will automatically alert the operator via audible and/or visual alerts whenever the apparatus exceeds the safe height limit.

Thus, in some respects, the present invention operates in a manner opposite to that of the existing art. Whereas, in existing systems, a potentially hazardous height may be present or maintained while sensing oncoming obstructions to prompt operator reaction such as vehicle braking, the present invention forces an operator to power beyond a safe limit, knowing that safe limit has been exceeded, then automatically lowering the elevated apparatus once the power beyond command is relieved.

Thus, the present invention provides for a more inherent collision-avoidance philosophy, such that whenever the operator allows the apparatus elevation mechanism to go inactive, whether such release is voluntary or involuntary, the invention automatically activates an apparatus lowering mechanism to bring the elevated apparatus back down to a predetermined safe height. As such, according to the invention, the elevated apparatus always "wants" to come down, but the operator must take steps to keep the apparatus elevated.

Although there are systems associated with lifting apparatus to prevent the realization of an unsafe vertical elevation, these approaches are very rudimentary and may be undermined by the operator. For example, a related function has been achieved by using a physical restraining mechanism in the form of a chain to limit the height to which the apparatus may be elevated. A serious disadvantage of such a physical restraining mechanism is the inability of the operator to raise the apparatus above a safe height, for whatever reason, unless the operator physically disables the system by removing the restraining mechanism. This not only severely limits the functionality of the instrumented equipment, but, typically, once such a restraining mechanism or chain has been removed, it may not be reinstated, thereby potentially reestablishing a collision situation.

According to the present invention, electronics are used which continuously monitors various system inputs such as apparatus height, power beyond intent, and vehicle speed, such that when the apparatus height initially exceeds the predetermined safe height, the system immediately notifies the operator via an alert, which may be audible or visual, i.e., in the form of a dash-mounted indicator. In a preferred embodiment, as the operator continues to power the apparatus beyond this safe height, an audible alert will intermittently be given, for example, every few seconds or so, so as to remind the operator that the system is in an overriding mode and may be exposing the vehicle to a potential collision. However, according to the invention, during this time in which the operator is constantly alerted, it is assumed that the operator is watching for such collisions in a more intense manner, thereby lowering the risk associated with existing approaches.

As soon as the electronics of the invention detect that the operator is no longer attempting to power the apparatus beyond the safe height, assuming the apparatus is in an unsafe position, an automatic power down mechanism is automatically activated to lower the apparatus back to the safe height. Again, in a preferred embodiment, the intermediate audible or visual alert will continue to be given until the apparatus has returned to the safe position.

Overall, the system performs four primary functions. First, the system detects the current height of the elevated apparatus in terms of safe level; that is, whether it is below or beyond a predetermined safe height. Secondly, the invention detects when the operator is manually overriding the system to raise the apparatus beyond the safe level (power beyond). Thirdly, optionally, the invention detects when the vehicle is moving. Such a feature may be added for convenience and further safety. Finally, as appropriate, the invention automatically activates whatever mechanism is used to lower the apparatus to a safe level, that is, to automatically power down the mechanism, be it through hydraulic valve, electronic means, or whatever system, as appropriate.

FIG. 1 illustrates, in a simplified form, a vehicle, in this case a forklift 12, wherein the vertically extensible rails and lift mechanism 14 are being automatically lowered to a safe position 16 since an operator 18 is no longer activating a raise handle 20. Thus, the cargo 22, in this case, will avoid collision with an overhead object 24, as the mechanism 14 continues to move downwardly. The alert to the operator 18, not visible in FIG. 1, will continue to be activated, however, until the safe position 16 has automatically been achieved according to the invention.

Figure 2:
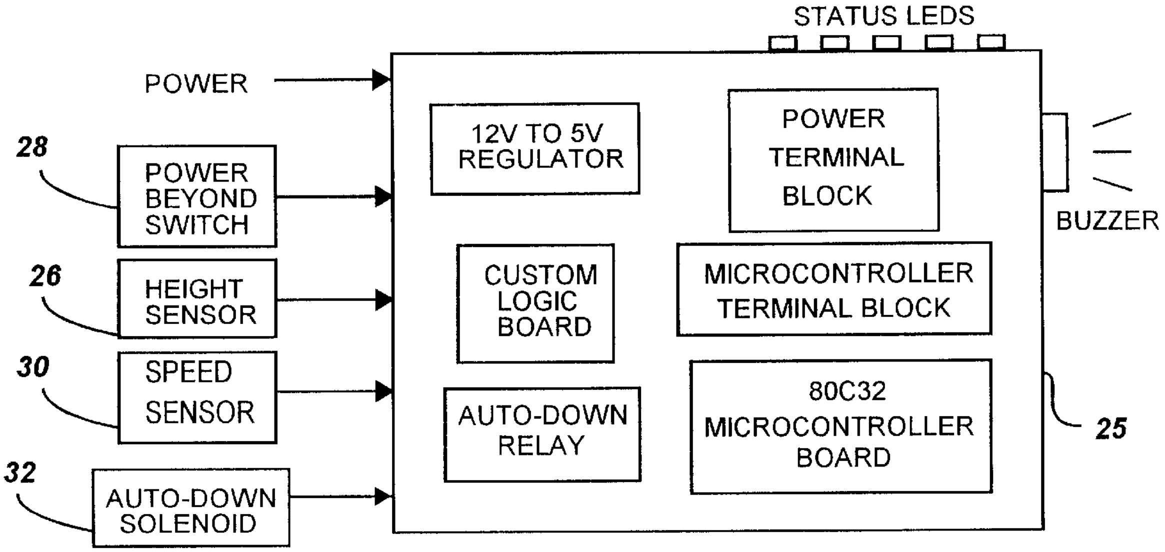
FIG. 2 is a block diagram of an electronic module useful in implementing the invention.

Now making reference to FIG. 2, there is shown in block diagram associated with a hardware implementation of the invention. Overall, the purpose of the electronics underlying the block diagram of FIG. 2 is to accept inputs from external sensors, make decisions regarding the current status of the elevator apparatus, operator intent, vehicle speed, and initiate an appropriate action. Preferably, the decision making capability is in the form of a microprocessor or single-chip microcomputer of conventional design such as the 80C32 C-MOS processor from Motorola Inc. This approach is preferably taken due to the high degree of availability of such components, and their low cost, though it would be understood to one of skill in electronic design that alternative approaches, including discrete logic, may alternatively be utilized. Power is provided from the vehicle, which is typically 12 volts, and down-converted and regulated to five volts for use by the electronic circuits, which is a typical supply voltage therefore.

Height sensors 26 are used to report the current height of the elevated apparatus to the electronics module 25. This height could be reported as an actual value, that is, as height in feet, or, as a simple safe/unsafe status. Using a dump truck having an elevated apparatus in form of a dump box used to apply salt to a roadway, the box height sensors 26 may take the form of a pair of magnetics which is mounted on the rear pivot shaft of the dump box to determine whether or not the box has been elevated above a predetermined safe height, in this example, of about 12 feet. As an alternative to simple magnetic switches, the height detection function may be performed by mechanical switches, rotary potentiometers, LVDTs and the like. The only important aspect is that the height detection sensors indicate when the elevated apparatus in an "unsafe" position, again, whether through an exact measurement or go/no go indication.

The power-beyond detection sensor 28 is used to notify the electronics module 25 of the operator's intent, that is, whether the operator is purposely elevating the apparatus beyond the predetermined safe level. As discussed above, one advantage of this approach of existing physical restraints is that it allows the operator to knowingly, albeit temporarily, override the system when circumstances necessitate. Again using salt trucks as an example, the operators of such trucks are occasionally called upon to elevate the dump box beyond the safe height in order to shift their salts loads to the rear of the box.

In terms of implementation, the power beyond detection sensor may again use a simple mechanical micro-switch mounted on the lever used to raise and lower the elevated apparatus. In the salt truck example, such a switch may be mounted on the hydraulic lever used to operate the hydraulic valves which raise and lower the dump box. As with the height detection sensor, however, alternatives may be used, whether in the form of mechanical, pressure-related or magnetically operated devices, and may be mounted on the apparatus elevation control mechanism in any form so long as they perform the functions herein disclosed. The critical issue is to ensure that the electronics are informed that the operator is intending to elevate the apparatus beyond the predetermined "safe" height.

An optional vehicle speed sensor 30 may be employed to notify the electronics 25 whether or not the vehicle is moving and, as a further option, in which direction. Many speed indicating devices are available in the prior art, including inductive pick-ups mounted to the vehicle transmission, drive train wheels or speedometer interconnects. Any sensor which detects motion can be used as a speed sensor according to the invention so long as it accurately conveys a signal indicative of actual speed.

The interface 32 to auto down activation mechanism allows the system to automatically lower the elevated apparatus in accordance with operator intent. In the event that such apparatus is raised and lower via a hydraulic control system, a typical auto-down activation mechanism according to the invention takes the form of a solenoid activated hydraulic valve. When appropriate, the electronics module 25 outputs a signal to the solenoid 32, which brings the elevated apparatus down in the absence of a power-beyond command.

We claim:

1. A collision avoidance system for a vehicle of the type having a powered lift mechanism with a lift control used to move the mechanism between a predetermined safe position and an elevated position, the system comprising:

a first sensor to determine whether the mechanism is in the safe or the elevated position;

a second sensor to determine whether an operator is using the lift control to power the mechanism beyond the safe position; and control electronics connected to the first and second sensors and to the lift control, the electronics being operative to automatically transfer the mechanism from the elevated position to the safe position in the event that the operator is not using the lift control to power the mechanism beyond the safe position.

2. The collision avoidance system of claim 1, further including means for alerting an operator of the vehicle when the mechanism is in the elevated position.

3. The collision avoidance system of claim 2, wherein the means for alerting the operator functions on an intermittent, periodic basis until the mechanism is brought back to the safe position.

4. The collision avoidance system of claim 1, further including a vehicle speed sensor coupled to the control electronics causing the automatic transfer the mechanism to occur move rapidly as a function of increasing vehicle speed.

5. In a vehicle of the type having a powered lift mechanism with a lift control used to move the mechanism between a predetermined safe position and an elevated position, a collision avoidance method comprising the steps of:

sensing whether the mechanism is in the safe or the elevated position;

sensing whether an operator is using the lift control to power the mechanism beyond the safe position; and if the mechanism is in the elevated position and operator is not using the lift control to power the mechanism beyond the safe position, automatically moving the mechanism back to the safe position from the elevated position.

6. The method of claim 5, further including the step of alerting an operator of the vehicle when the mechanism is in the elevated position.

7. The method of claim 6, further including the step of alerting the operator on an intermittent, periodic basis until the mechanism is brought back to the safe position.

8. The method of claim 5, further including the steps of:

sensing vehicle speed; and automatically transferring the mechanism move rapidly as a function of increasing vehicle speed.

9. A collision avoidance system, comprising:

a vehicle having a powered lift mechanism with a lift control used to move the mechanism between a predetermined safe position and an elevated position; and an electronic module on-board the vehicle, the module including:

a first sensor to determine whether the mechanism is in the safe or the elevated position;

a second sensor to determine whether an operator is using the lift control to power the mechanism beyond the safe position; and a controller connected to the first and second sensors and to the lift control, the controller being operative to automatically transfer the mechanism from the elevated position to the safe position in the event that the operator is not using the lift control to power the mechanism beyond the safe position.

10. The collision avoidance system of claim 9, further including means on-board the vehicle for alerting an operator when the mechanism is in the elevated position.

11. The collision avoidance system of claim 10, wherein the means for alerting the operator functions on an intermittent, periodic basis until the mechanism is brought back to the safe position.

12. The collision avoidance system of claim 9, further including a vehicle speed sensor coupled to the controller causing the automatic transfer the mechanism to occur move rapidly as a function of increasing vehicle speed.

* * * * *